US010411747B2

(12) United States Patent
Qian et al.

(10) Patent No.: US 10,411,747 B2
(45) Date of Patent: Sep. 10, 2019

(54) CASE HAVING BATTERY BOX FOR SMART PHONE/TABLET

(71) Applicants: Davy Zide Qian, Arcacia, CA (US); Benyu Qian, Shanghai (CN); Lequn Lu, Shanghai (CN)

(72) Inventors: Davy Zide Qian, Arcacia, CA (US); Benyu Qian, Shanghai (CN); Lequn Lu, Shanghai (CN)

(*) Notice: Subject to any disclaimer, the term of this patent is extended or adjusted under 35 U.S.C. 154(b) by 0 days.

(21) Appl. No.: 15/822,084

(22) Filed: Nov. 24, 2017

(65) Prior Publication Data
US 2018/0152216 A1 May 31, 2018

Related U.S. Application Data

(60) Provisional application No. 62/426,405, filed on Nov. 25, 2016.

(51) Int. Cl.
H04B 1/38 (2015.01)
H04B 1/3883 (2015.01)
G06F 1/16 (2006.01)
H02J 7/02 (2016.01)
H04B 1/3888 (2015.01)
H04M 1/02 (2006.01)
H02J 7/00 (2006.01)
H02J 50/10 (2016.01)
H04M 1/18 (2006.01)

(52) U.S. Cl.
CPC ......... H04B 1/3883 (2013.01); G06F 1/1628 (2013.01); H02J 7/0045 (2013.01); H02J 7/0054 (2013.01); H02J 7/0055 (2013.01); H02J 7/025 (2013.01); H02J 50/10 (2016.02); H04B 1/3888 (2013.01); H04M 1/0262 (2013.01); H02J 2007/0062 (2013.01); H04M 1/185 (2013.01)

(58) Field of Classification Search
CPC ...... H02J 7/025; H04M 1/0262; H04B 1/3888
See application file for complete search history.

(56) References Cited

U.S. PATENT DOCUMENTS

| 2006/0068274 | A1* | 3/2006 | Lee | H01M 2/1022 429/100 |
| 2007/0298318 | A1* | 12/2007 | Li | E05B 65/006 429/97 |
| 2009/0312058 | A9* | 12/2009 | Wood | H04B 1/3888 455/566 |

(Continued)

Primary Examiner — Tuan Pham
(74) Attorney, Agent, or Firm — Global IP Services; Tianhua Gu

(57) ABSTRACT

A case having battery box for smart phone/tablet comprises a box of smart phone/tablet, which is a rectangular open box having four side walls and a bottom, a chamber of the box of smart phone/tablet is the same of the size and shape of the smart phone/tablet, a top of each side wall is bended inward to form a holding ring for the smart phone/tablet; a battery box for containing batteries, which is a rectangular open box having a bottom which is a part bottom of the box of smart phone/tablet; a battery electric connecting means for connecting the batteries, with a power plug of the smart phone/tablet; a cover for closing the battery box and holding the batteries in the battery box; and a lock means for locking the cover with the battery box.

16 Claims, 6 Drawing Sheets

(56) References Cited

U.S. PATENT DOCUMENTS

| | | | |
|---|---|---|---|
| 2015/0349831 A1* | 12/2015 | Young | H04B 1/3888 |
| | | | 455/575.8 |
| 2016/0181580 A1* | 6/2016 | To | H01M 2/1066 |
| | | | 429/100 |
| 2017/0368433 A1* | 12/2017 | Nelson | A63B 67/002 |

* cited by examiner

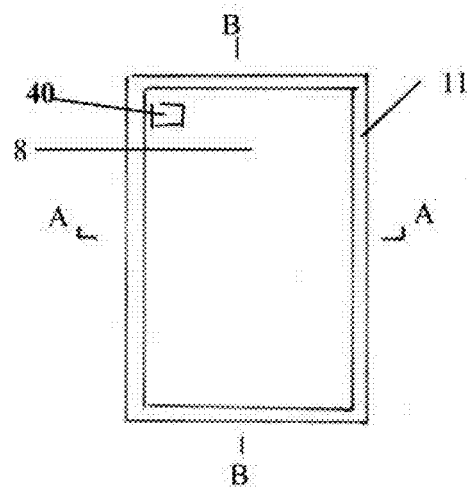
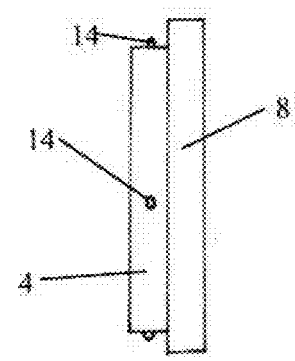
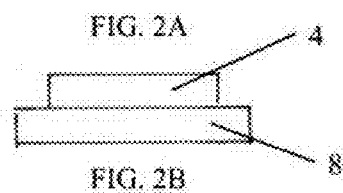
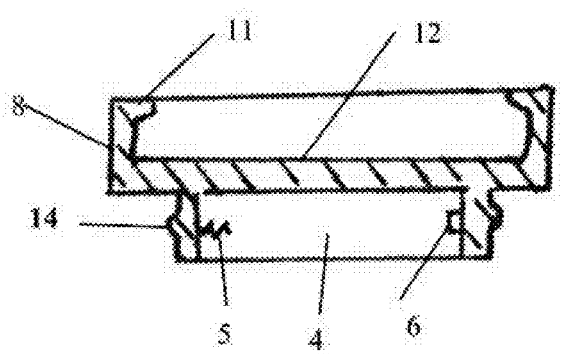
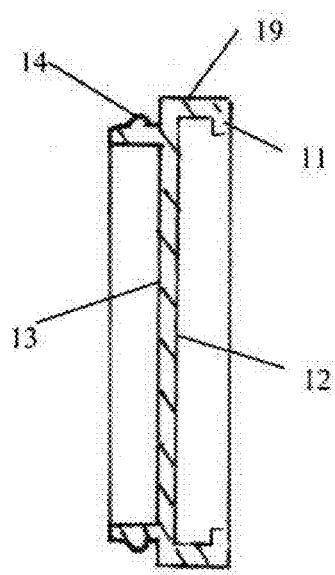
FIG. 2A
FIG. 2C
FIG. 2B
FIG. 2D
FIG. 2E

CASE HAVING BATTERY BOX FOR SMART PHONE/TABLET

CROSS REFERENCE TO RELATED PATENT APPLICATION

The present application claims priorities of U.S. 62/426,405 filed Nov. 25, 2016, which application is incorporated herein by reference.

FIELD OF THE INVENTION

A case having battery box for smart phone/tablet, which belongs to the accessories of mobile phones and tablets.

BACKGROUND OF THE INVENTION

Now, the scale of smart phones and tablets grew and grew and the time, people using smart phone, becomes longer and longer. Especially, bigger smart phones, such as iPhone 6 plus, tablets, large sized Android devices are getting more and more popular. But there is a lack of long battery life for sustaining these devices. Various existing shells for mobile phone/tablet, they just have functions of protection, but cannot solve the above-mentioned difficulty of lack of long battery life for sustaining these devices.

The purpose of the present invention is to provide a case having battery box for smart phone/tablet for solve the above mentioned difficulty, i.e. the new case has a battery box, in which there are batteries and wireless charging card, which become a second energy supplying device for the smart phone/tablet. Also, the used batteries in the battery box can be replaced by new batteries easily.

SUMMARY OF THE INVENTION

The purpose of present invention is realized by the following conceptions:

A case having battery box for smart phone/tablet comprising:
a box of smart phone/tablet, which is a rectangular open box having four side walls and a bottom, a chamber of the box of smart phone/tablet is the same of the size and shape of the smart phone/tablet, a top of each side wall is bended inward to form a holding ring for the smart phone/tablet;
a battery box for containing batteries, which is a rectangular open box having a bottom which is a part bottom of the box of smart phone/tablet;
a battery electric connecting means for connecting the batteries with a power plug of the smart phone/tablet;
a cover for closing the battery box and holding the batteries in the battery box; a lock means for locking the cover with the battery box.

In another embodiment, the battery box and the box of smart phone/tablet are separated single unite, they are connected together by a connecting means.

The battery box has four side walls and a chamber for holding 8 AA or AAA batteries, each outside surface of the four side walls has a hump for locking the cover with the battery box.

The cover is an open rectangular box having four side wall and a bottom, each inside surface of the four sides walls of the cover has a concavity, which is corresponding to the hump of the battery box, the humps and the concavities consist of the lock means, during the cover being put on the battery box the humps enter the concavities respectively, thereby the cover of battery box is locked with the battery box.

the battery electric connecting means comprises eight connecting pieces and eight connecting springs, four connecting pieces and four connecting springs consist of a connecting group, in the connecting group the four connecting pieces and four connecting springs are connected in series, thereafter two connecting groups are connected in parallel and then connected with the power plug of the smart phone/tablet.

A wireless charging card is fixed on a back surface of the bottom of the cover, and the wireless charging card is connected with a switch in series then with the two connecting groups in parallel, when the wireless charging card being powered the switch on, otherwise the switch off.

The case having battery box for smart phone/tablet brings big convinces to the smart phone/tablet users. The battery box can hold eight AA or AAA sized batteries, which provide enough energy to a smart phone or tablet to work a long time. Also, the case having battery box for smart phone/tablet makes people, who travel far and long distance, such as climbers and hikers or work in open country, possible to carry enough regular AA/AAA sized dry batteries, so that in case they get lost for many days they can still utilize their additional AA/AAA batteries to call for help.

BRIEF DESCRIPTION OF THE DRAWINGS

FIG. 2A is a front elevational view of the box of smart phone/tablet and the battery box.

FIG. 2B is a top plan view of the FIG. 2a.

FIG. 2C is a left side elevational view of the FIG. 2a.

FIG. 2D is a cross section view along A-A line of the FIG. 2a.

FIG. 2E is a cross section view along B-B line of the FIG. 2a.

FIG. 3B is a cross section view along C-C line of the FIG. 3a.

FIG. 4B is a top plan view of the FIG. 4a.

DETAIL DESCRIPTION OF THE INVENTION

Figure 1A:
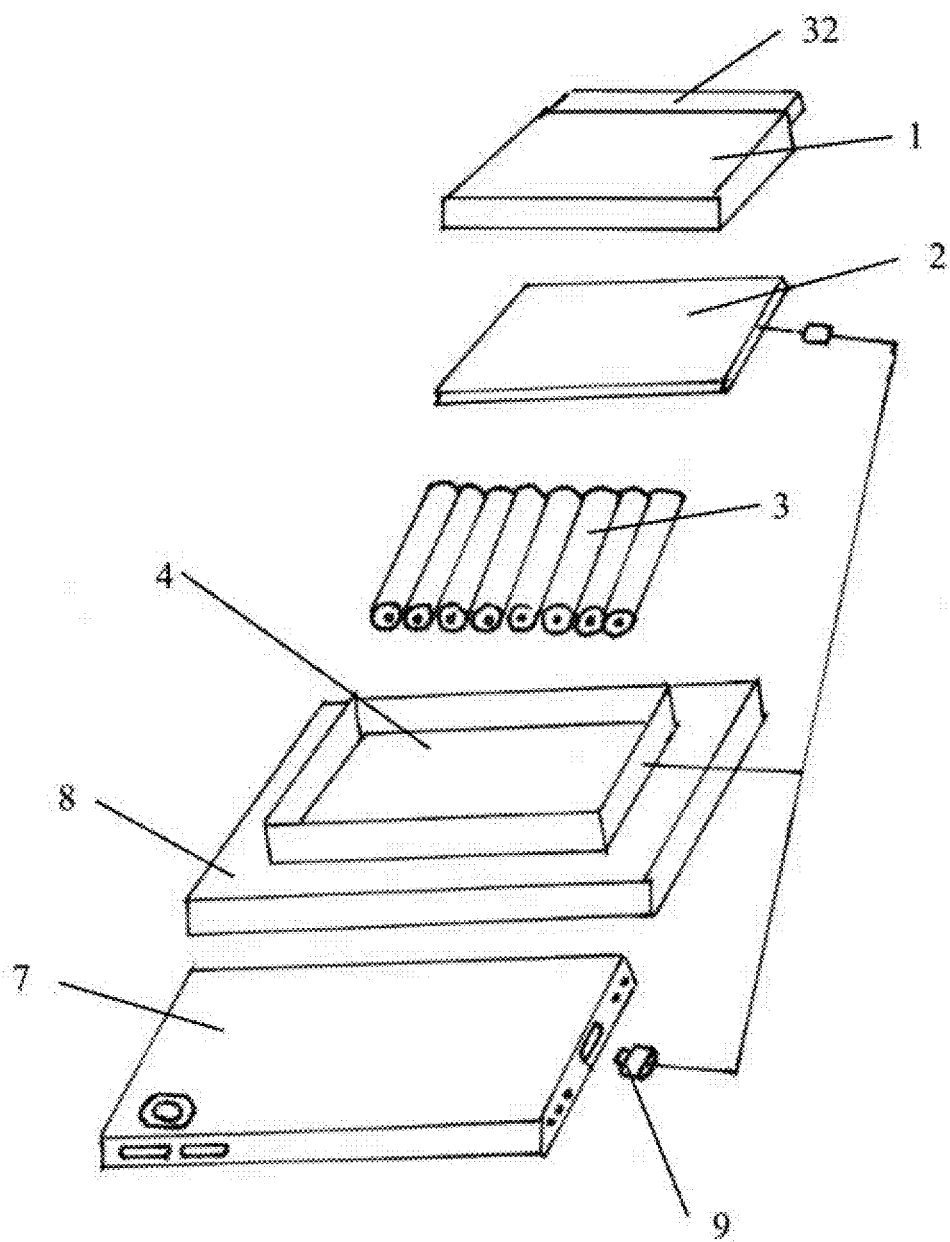
FIG. 1A is a explode view of the case having battery box for smart phone/tablet.
Figure 1B:
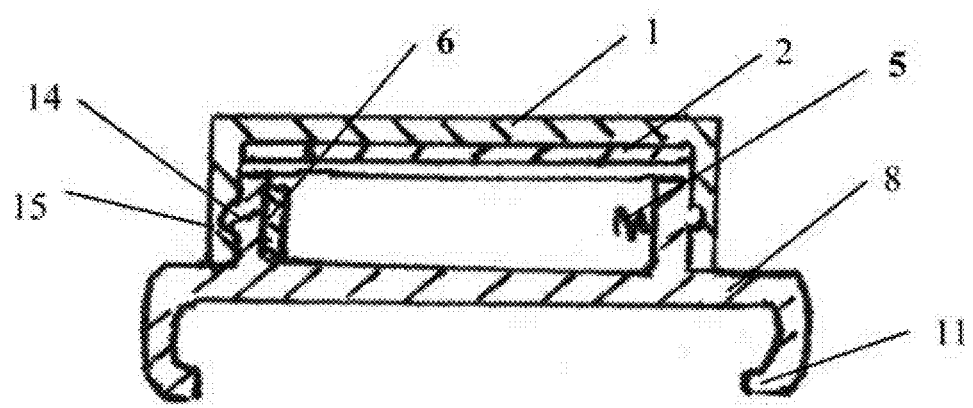
FIG. 1B is a cross section view of the case having battery box for smart phone/tablet.

Please refer to the FIG. 1 and FIG. 1b. The case having battery box for smart phone/tablet comprises a box of smart phone/tablet 8, a battery box 4, a battery electric connecting means, a cover 1 for closing the battery box 4, a wireless charging card 2, batteries 3 and a smart phone/tablet 7. The batteries 3 is put in the battery box 4, the smart phone/tablet 7 is put in the box of smart phone/tablet 8.

Please refer to the FIGS. 2a, 2b, 2c, 2d and 2e. The box of smart phone/tablet 8 is a rectangular open box with four side walls 19 and a rectangular bottom 12, the tops of four side walls 19 are bended inward to form a holding ring 11 for the smart phone/tablet 7. The bottom 12 has a hole 40 for the camera lens of the smart phone/tablet. The chamber of the box of smart phone/tablet 8 has a same size and shape with the smart phone/tablet 7.

The battery box 4 is a rectangular open box with four side walls and a rectangular bottom. The bottom 13 is smaller than the bottom 12 of the box of smart phone/tablet 8 and the bottom 13 is a part of the bottom 12. The chamber of the battery box 4 can hold eight batteries 3 (AA or AAA). Each outside face of the four side wall has a hump 14 for locking the cover 1.

The cover 1 for closing battery box 4 is a rectangular open box with four side walls 21 and a rectangular bottom 16. The camber of the cover 1 has same size and shape of the battery box 4. Each inside face of the side walls 21 has a concavity 15, which is corresponding to the hump 14. When the cover 1 is put on the battery box 4 and is pressed down, the humps 14 enter into the concavities 15 respectively, thereby the cover 1 is locked with the battery box 4 together.

The cover 1 has a holding bar 32 connected with a side of the cover 1 of battery box for holding the case having battery box for smart phone/tablet in convenient.

The wireless charging card 2 is a rectangular card, which is fixed on the inside face of the bottom 16 of the cover 1. The wireless charging card 2 can be get from the market.

Figure 1C:
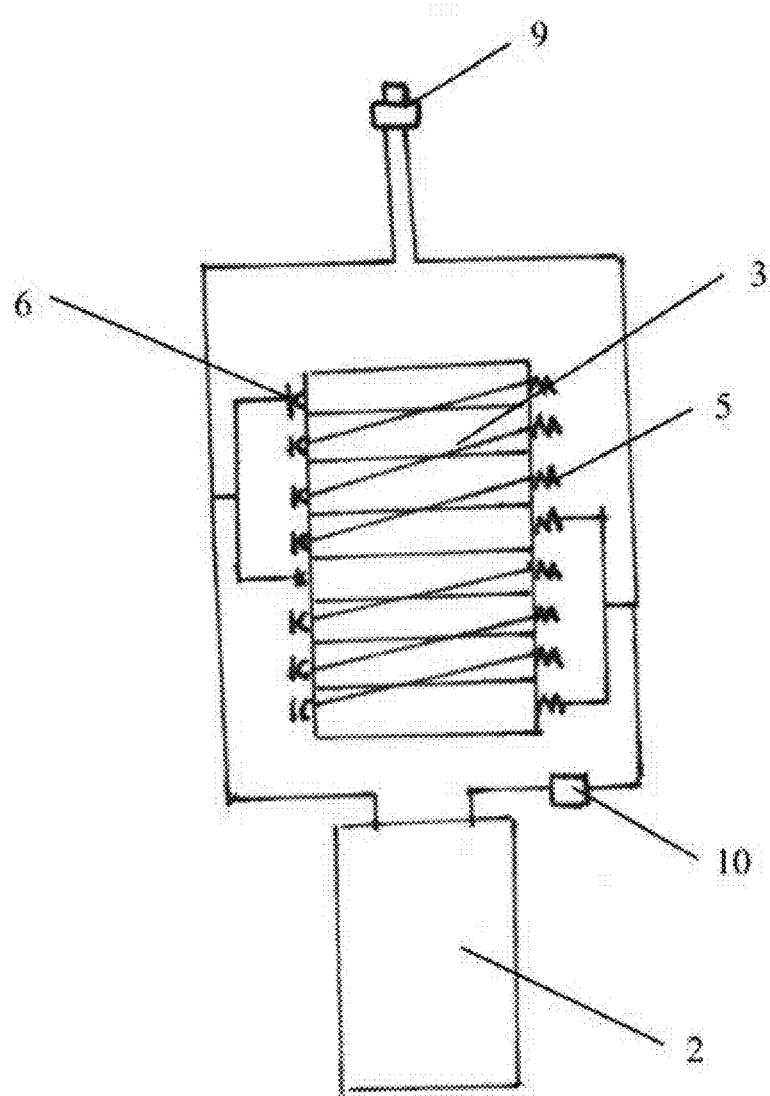
FIG. 1C is an electric connection diagrammatic sketch for the case having battery box for smart phone/tablet.
Figure 3B:
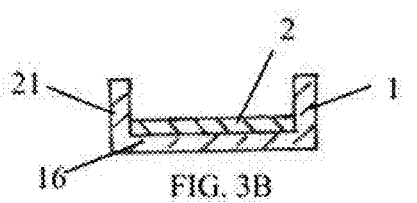
Figure 3A:
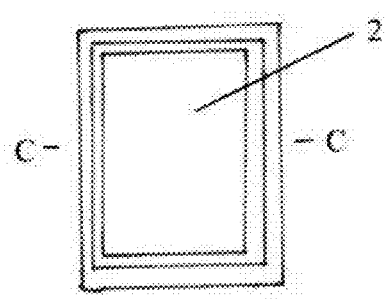
FIG. 3A is a front elevational view of the cover for the battery box.

Please refer to FIG. 1c. The battery electric connecting means comprises eight connecting piece 6 and eight connecting springs 5. Four connecting pieces 6 and four connecting spring 5 consist of a connecting group, in which the connecting pieces 6 and connecting springs 5 are connected in series. Two connecting groups are connected in parallel and then connected with the power plug 9 of the smart phone/tablet 7.

The battery box 4 contains 8 AA batteries or 8 AAA batteries, 4 batteries become a group, 8 batteries become 2 groups. In each group 4 batteries are connected in series, the two groups of batteries are connected in parallel.

The wireless charging card 2 is connected with a switch 10 in series then with the two connecting groups in parallel, when the wireless charging card 2 being powered the switch on, otherwise the switch off.

Figure 4C:
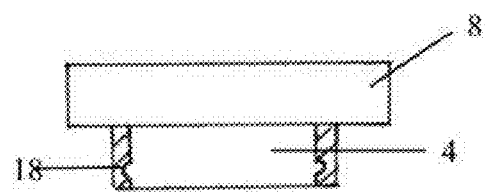
FIG. 4C is a partial cross section view of the battery box for the second embodiment.
Figure 4A:
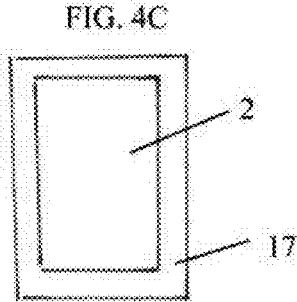
FIG. 4A is a front elevational view of the cover for the battery box for a second embodiment.
Figure 4B:
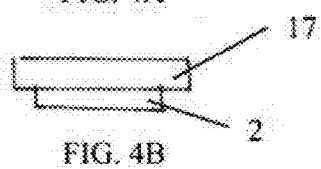

Please refer to FIGS. 4a, 4b and 4c. In second embodiment, the cover 17 is a rectangular plate. The wireless charging card 2 is fixed on the cover 17. Two opposite walls of the battery box have a couple grooves 18, the cover 17 can be inserted into the two grooves 18 to close the battery box 4.

The box of phone/tablet 8, battery box 4 and cover 1, 17 are made by elastic material, such as plastic material.

Please refer to FIGS. 5a, 5b, 5c and 5d, which relate to a third embodiment. The battery box 20 is separated from the box of phone/tablet 22. Except the above-mentioned difference other characters, such as the scale and shape of the battery box 20 and box of phone/tablet 22, the battery electric connecting means are the same of the first embodiment.

The battery box 22 is connected with the box of phone/tablet by a connecting means, which includes a key 23 on a back surface of the battery box 20 and a groove 29 on a back surface of the box of smart phone/tablet 22 or vise versa, the key 23 is inserted into the groove 29, thereby the battery box 20 is connected with the box of smart phone/tablet 22 tightly.

In another embodiment the connecting means is a hook and loop fastener, one piece of hook 28 is stuck on a back surface of the battery box 20 and other piece of loop 27 is stuck on a back surface of the box of smart phone/tablet 22 or vise versa, thereby the battery box 20 is connected with the box of smart phone/tablet 22 tightly.

The battery box 20 has a cover 41. The cover 41 is connected with the battery box by hinges 30. A lock means of hasp 24 locks or releases the lock for the cover 41 and the battery box 22.

A hold bar 31 is connected with a side of the cover of battery box for hand holding the case having battery box for smart phone/tablet in convenient.

Figure 5A:
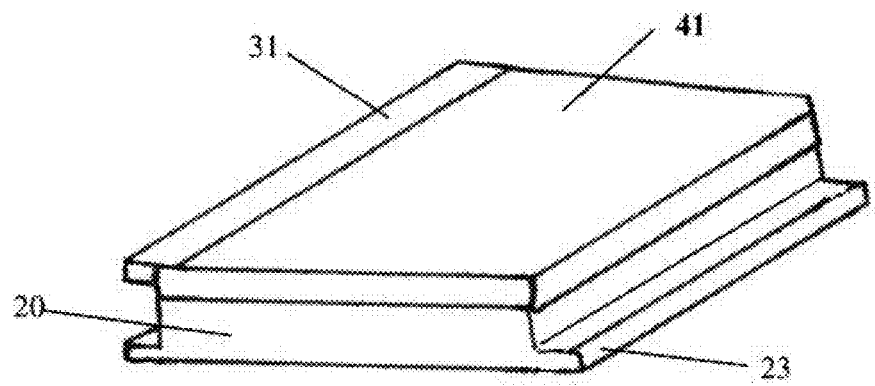
FIG. 5A is a battery box of the third embodiment
Figure 5B:
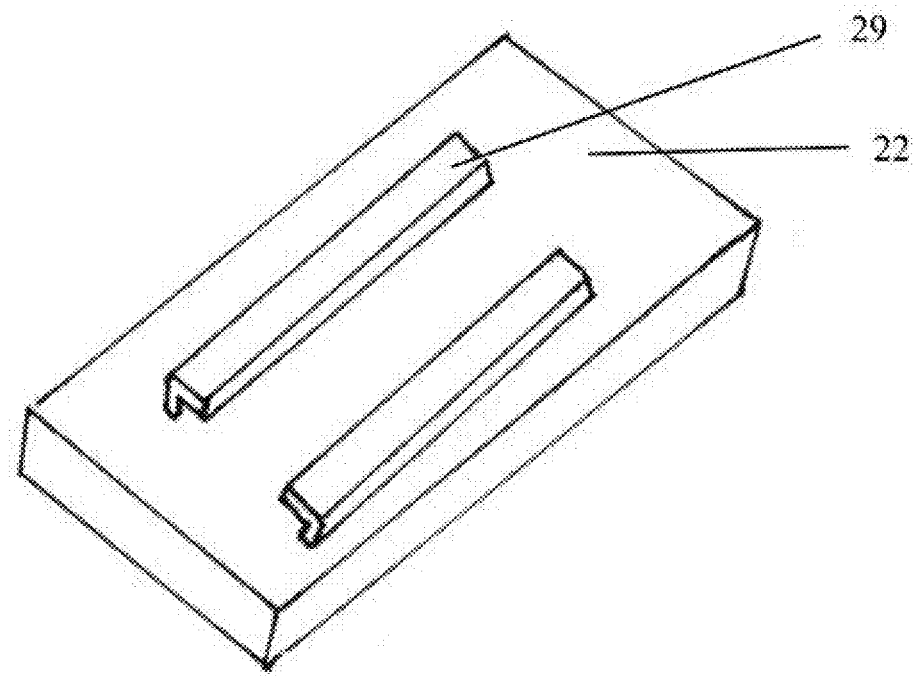
FIG. 5B is a box of smart phone/tablet of the third embodiment.
Figure 5C:
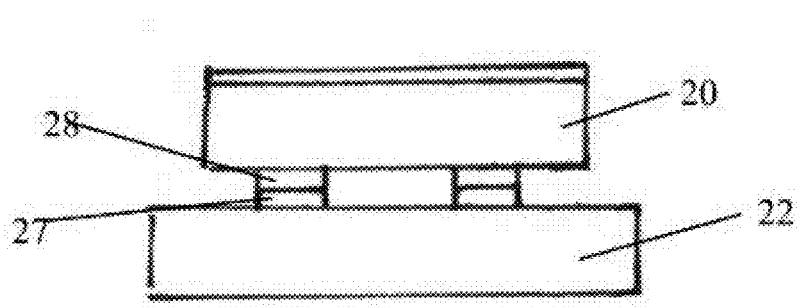
FIG. 5C is the battery box to connect with the box of smart phone/tablet by hook and loop fastener in the third embodiment.
Figure 5D:
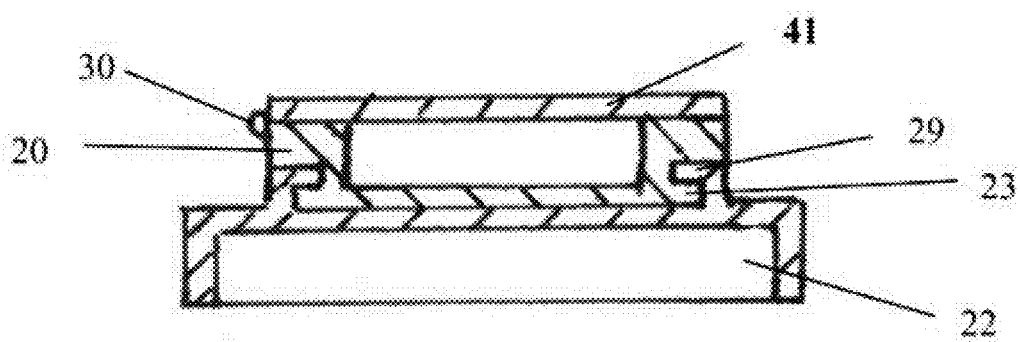
FIG. 5D is the battery box to connect with the box of smart phone/tablet by key and key groove in the third embodiment.
Figure 5E:
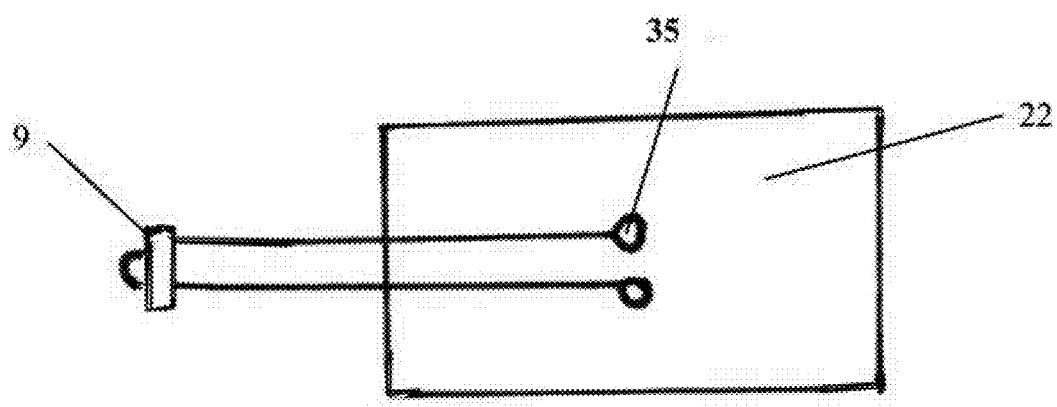
FIG. 5E is the box of smart phone/tablet has a first pair of electric connecter in the third embodiment.
Figure 5F:
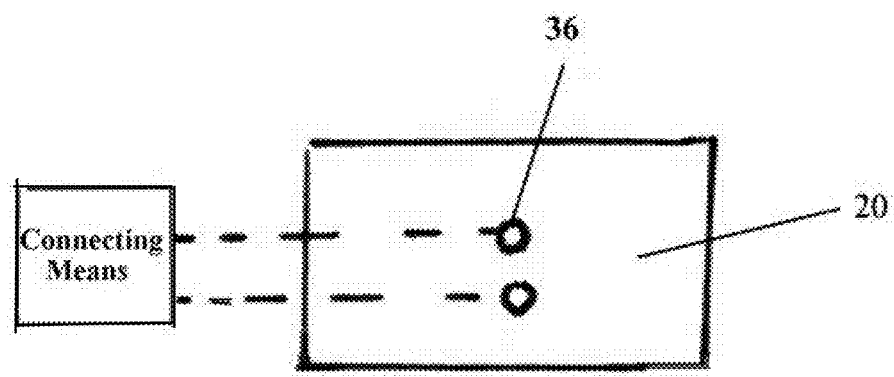
FIG. 5F is the battery box has a second pair of electric connecter in the third embodiment.

Please refer to FIGS. 5d, 5e and 5f, the back surface of the box of smart phone/tablet 22 has a first pair of electric connecter 35, which is connected with the power plug 9 of the smart phone/tablet, the back surface of the battery box 20 has a second pair of electric connecter 36, which is connected with the battery electric connecting means, after the battery box is connected with the box of smart phone/tablet, the first and second pair of electric connectors 35 and 36 are touch together.

What is claimed is:

1. A case having battery box for smart phone/tablet comprising:
    a box of smart phone/tablet, which is a rectangular open box having four side walls and a bottom, a chamber of the box of smart phone/tablet is the same of the size and shape of the smart phone/tablet, a top of each side wall is bended inward to form a holding ring for the smart phone/tablet;
    a battery box for containing 8 AA batteries or 8 AAA batteries as a second energy supply for a smart phone or tablet to work a long time, the battery box is a rectangular open box having a bottom which is a part bottom of the box of smart phone/tablet;
    a battery electric connecting means for connecting the batteries with a power plug of the smart phone/tablet;
    a cover for closing the battery box and holding the batteries in the battery box;
    a lock means for locking the cover with the battery box;
    wherein the battery electric connecting means comprises eight connecting pieces and eight connecting springs, four connecting pieces and four connecting springs consist of a connecting group, in the connecting group the four connecting pieces and four connecting springs are connected in series, thereafter two connecting groups are connected in parallel and then connected with the power plug of the smart phone/tablet.

2. The case having battery box for smart phone/tablet of claim 1, wherein the battery box has four side walls and a chamber for holding the 8 AA batteries or 8 AAA batteries, each outside surface of the four side walls has a hump for locking the cover with the battery box.

3. The case having battery box for smart phone/tablet of claim 1, wherein the battery electric connecting means comprises eight connecting pieces and eight connecting springs, four connecting pieces and four connecting springs consist of a connecting group, in the connecting group the four connecting pieces and four connecting springs are connected in series, thereafter two connecting groups are connected in parallel and then connected with the power plug of the smart phone/tablet.

4. The case having battery box for smart phone/tablet of claim 1, wherein the cover is an rectangular plate, each inside of the two opposite walls of the battery box have a groove, the cover with plate shape inserts into the two grooves to close the battery box.

5. The case having battery box for smart phone/tablet of claim 1, wherein a wireless charging card is fixed on a back surface of the bottom of the cover, and the wireless charging card is connected with a switch in series then with the two connecting groups in parallel, when the wireless charging card being powered the switch on, otherwise the switch off.

6. The case having battery box for smart phone/tablet of claim 4, wherein a wireless charging card is fixed on a back surface of the cover, and the wireless charging card is connected with a switch in series then the two connecting groups in parallel, when the wireless charging card being powered the switch on, otherwise the switch off.

7. The case having battery box for smart phone/tablet of claim 1, wherein the box of phone/tablet, battery box and cover are made by elastic material.

8. The case having battery box for smart phone/tablet of claim 1, wherein the cover has a holding bar connected with a side of the cover of battery box for holding the case having battery box for smart phone/tablet in convenient.

9. A case having battery box for smart phone/tablet comprising:
   a box of smart phone/tablet, which is a rectangular open box having four side walls and a bottom, a chamber of the box of smart phone/tablet is the same of the size and shape of the smart phone/tablet, a top of each side wall is bended inward to form a holding ring for the smart phone/tablet;
   a battery box for containing 8 AA batteries or 8 AAA batteries as a second energy supply for a smart phone or tablet to work a long time, the battery box is a rectangular open box with a turnable cover;
   a connecting means for the box of smart phone/tablet and the battery box;
   a battery electric connecting means for connecting the batteries, with a power plug of the smart phone/tablet;
   a lock means for locking the cover with the battery box;
   wherein the battery electric connecting means comprises eight connecting piece and eight connecting spring, four connecting pieces and four connecting springs consist of a connecting group, in the connecting group the four connecting pieces and four connecting springs are connected in series, thereafter two connecting groups are connected in parallel and then connected with the power plug of the smart phone/tablet.

10. The case having battery box for smart phone/tablet of claim 9, wherein the connecting means includes two male keys on a back surface of the battery box and two female grooves on a back surface of the box of smart phone/tablet or vise versa, the two male keys are inserted into the two female grooves, thereby the battery box is connected with the box of smart phone/tablet tightly.

11. The case having battery box for smart phone/tablet of claim 10, wherein the connecting means is a hook and loop fastener, one piece of hook is stuck on a back surface of the battery box and other piece of loop is stuck on a back surface of the box of smart phone/tablet or vise versa, thereby the battery box is connected with the box of smart phone/tablet tightly.

12. The case having battery box for smart phone/tablet of claim 9, wherein the battery box has a chamber for holding the 8 AA batteries or 8 AAA batteries.

13. The case having battery box for smart phone/tablet of claim 9, wherein a wireless charging card is fixed on a back surface of the cover, and the wireless charging card is connected with a switch then with the two connecting means in parallel, when the wireless charging card being powered the switch on, otherwise the switch off.

14. The case having battery box for smart phone/tablet of claim 9, wherein the back surface of the box of smart phone/tablet has a first pair of electric connecter, which is connected with the power plug of the smart phone/tablet, the back surface of the battery box has a second pair of electric connecter, which is connected with the battery electric connecting means, after the battery box is connected with the box of smart phone/tablet, the first and second pair of electric connectors are touch together.

15. The case having battery box for smart phone/tablet of claim 9, wherein the cover is connected with the battery box by hinges, the lock means is a hasp.

16. The case having battery box for smart phone/tablet of claim 9, wherein the cover has a holding bar connected with a side of the cover of battery box for holding the case having battery box for smart phone/tablet in convenient.

* * * * *